United States Patent
Tat et al.

(10) Patent No.: US 8,600,015 B2
(45) Date of Patent: *Dec. 3, 2013

(54) NETWORK PROTOCOL CONVERTER

(75) Inventors: Dinh C. Tat, Bellevue, WA (US); Richard A. Layendecker, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,773

(22) Filed: Sep. 9, 2012

(65) Prior Publication Data

US 2012/0329454 A1 Dec. 27, 2012

Related U.S. Application Data

(63) Continuation of application No. 12/268,918, filed on Nov. 11, 2008, now Pat. No. 8,270,576, which is a continuation of application No. 10/615,892, filed on Jul. 7, 2003, now Pat. No. 7,450,697.

(51) Int. Cl.
*H04M 11/06* (2006.01)
*H04L 12/28* (2006.01)
*H04Q 3/00* (2006.01)
*H04W 4/00* (2009.01)

(52) U.S. Cl.
USPC ..... 379/88.14; 340/7.22; 340/7.23; 340/9.15; 370/331; 370/352; 370/466; 379/88.12; 379/88.13; 379/88.18; 455/412.2; 455/414.1; 455/432.1; 455/458; 455/466; 701/484; 709/206

(58) Field of Classification Search
USPC ............... 340/7.22, 7.23, 9.15; 370/466, 331, 370/352; 379/88.14, 88.12, 88.13, 88.18; 455/432.2, 458, 466, 412.2, 413, 455/414.1, 432, 432.1, 435.1; 701/484; 709/206

See application file for complete search history.

(56) References Cited

U.S. PATENT DOCUMENTS

| | | | | |
|---|---|---|---|---|
| 4,875,038 A * | 10/1989 | Siwiak et al. | ................. | 340/7.23 |
| 4,882,579 A * | 11/1989 | Siwiak | ................. | 340/7.23 |
| 4,891,637 A * | 1/1990 | Siwiak et al. | ................. | 340/7.23 |
| 5,142,279 A * | 8/1992 | Jasinski et al. | ................. | 340/7.22 |
| 5,459,458 A * | 10/1995 | Richardson et al. | ......... | 340/9.15 |
| 6,603,760 B1 * | 8/2003 | Smyk | ................. | 370/352 |
| 6,687,508 B1 * | 2/2004 | Dwyer et al. | ................. | 455/466 |
| 7,392,039 B2 * | 6/2008 | Souissi et al. | ................. | 455/412.2 |
| 7,450,697 B2 * | 11/2008 | Tat et al. | ................. | 379/88.14 |
| 7,539,491 B2 * | 5/2009 | Jain et al. | ................. | 455/435.1 |
| 7,640,029 B2 * | 12/2009 | Ala-Luukko | ................. | 455/466 |
| 7,801,539 B2 * | 9/2010 | Murtagh et al. | ................. | 455/466 |
| 7,822,416 B2 * | 10/2010 | Alexiou et al. | ................. | 455/432.1 |
| 7,848,767 B2 * | 12/2010 | McCann et al. | ................. | 455/466 |
| 7,995,715 B2 * | 8/2011 | Bhatia et al. | ................. | 379/88.12 |
| 8,270,576 B2 * | 9/2012 | Tat et al. | ................. | 379/88.14 |
| 2005/0008031 A1 * | 1/2005 | Tat et al. | ................. | 370/466 |
| 2009/0059956 A1 * | 3/2009 | Tat et al. | ................. | 370/466 |
| 2012/0329454 A1 * | 12/2012 | Tat et al. | ................. | 455/432.2 |

* cited by examiner

*Primary Examiner* — Gerald Gauthier
(74) *Attorney, Agent, or Firm* — Hartman & Citrin LLC (57) ABSTRACT

An arrangement includes an input to receive DTMF tones, logic to convert the DTMF tones to SMPP protocol, and an output to provide the SMPP protocol.

20 Claims, 7 Drawing Sheets

NETWORK PROTOCOL CONVERTER

This application is a continuation of U.S. patent application Ser. No. 12/268,918, filed Nov. 11, 2008, now U.S. Pat. No. 8,270,576, which is a continuation of U.S. patent application Ser. No. 10/615,892, filed Jul. 7, 2003, now U.S. Pat. No. 7,450,697; the contents of which are hereby incorporated by reference herein in their entirety into this disclosure.

TECHNICAL FIELD

The present disclosure relates to protocol conversion on a network.

BACKGROUND

Wireless telephones are popular, ubiquitous devices. It is now possible to make and receive phone calls from almost any place in the world. Communication is even possible from remote and undeveloped areas using wireless satellite telephones. Herein, the term wireless telephone refers to any device capable of transmitting and receiving voice and/or data (non-voice) information to and from a network without the use of wires, cables, or other tangible transmission media. So-called cellular telephones are a common example of wireless phones, as are paging devices.

Wireless telephones and pagers and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), pagers, and also a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

"Terminal device" refers to any device employed by a user (typically a person but also possibly an autonomous or semi-autonomous device system) to access the network environment. Examples of terminal devices are wireless telephones, pagers, PDAs, and devices that use conventional phone lines, such as Plain Old Telephone Service (POTS) phones.

A "service" is information and acts available via the network. Examples of services include Short Message Service (SMS), email, and stock quotes. A "service provider" is any device or combination of devices that provides services via the network environment. Typically, a service provider provides information delivery to terminal devices, and/or performs network actions in response to requests from terminal devices. A service provider may also provide information delivery and/or network actions on behalf of another service provider.

"Information" is configurations of matter representing knowledge, e.g. "data". Examples of information are collections of magnetic or optical bits. A "network element" is any one or more devices of a communication network, e.g. devices that participate at least occasionally in the operation of the network.

Terminal devices may provide paging capabilities. A typical pager is carried by a person and signals that person (e.g. by beeping or through vibration) when the pager receives information. Often, the information received is a telephone number or other identifying information for someone attempting to contact the person carrying the pager. Paging capabilities may be provided not only by dedicated paging devices but also by wireless telephones and other wireless devices.

During a typical paging process, the person paging dials a phone number or provides some other identifier of the person to page. The information is provided as DTMF tones to a network element, often referred to as a "paging terminal", which converts the DTMF tones to a protocol known as the Telocator Network Paging Protocol (TNPP).

The paging information may be communicated via TNPP among paging terminals of one or more networks. Eventually the paging information reaches a network that serves the person to page. There it is converted to the Short Message Peer to Peer (SMPP) protocol. SMPP is an efficient protocol for moving small amounts of data information (as opposed to digitized or analog voice information) through networks. The paging information is moved through the network using SMPP and delivered to the paging device of the person to page using, for example, the Short Message Service (SMS).

SMS, otherwise known as text messaging, mobile messaging, or alphanumeric paging, allows for the communication of short text and numeric messages to and from wireless devices, as well as to and from public SMS messaging gateways on the Internet. A detailed description of SMS is available as part of the GSM standard.

Another messaging technique that may be employed is Enhanced Message Service (EMS). EMS supports the capabilities of SMS to communicate short text and numeric messages, but also includes capabilities for the communication of other types of data, including sound, animation, graphics, and additional text-formatting capabilities. Yet another messaging technique that may be employed is Multimedia Message Service (MMS). MMS provides for the communication of video and other advanced multimedia formats.

The multiple protocol conversions that may take place under the conventional paging process may result in inefficiencies and traffic congestion during periods when a high amount of paging takes place.

SUMMARY

A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented in the description. One skilled in the relevant art can obtain a full appreciation of aspects of the invention from the subsequent detailed description, read together with the figures, and from the claims (which follow the detailed description).

An arrangement includes an input to receive Dual Tone Multi Frequency (DTMF) tones, logic to convert the DTMF tones to Short Message Peer to Peer (SMPP) protocol, and an output to provide the SMPP protocol.

A Short Message Service Center (SMSC) receives the SMPP protocol and forms a Short Message Service (SMS) message. A switching network element receives the SMS message and routes the SMS message to a paging device.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

Figure 1:
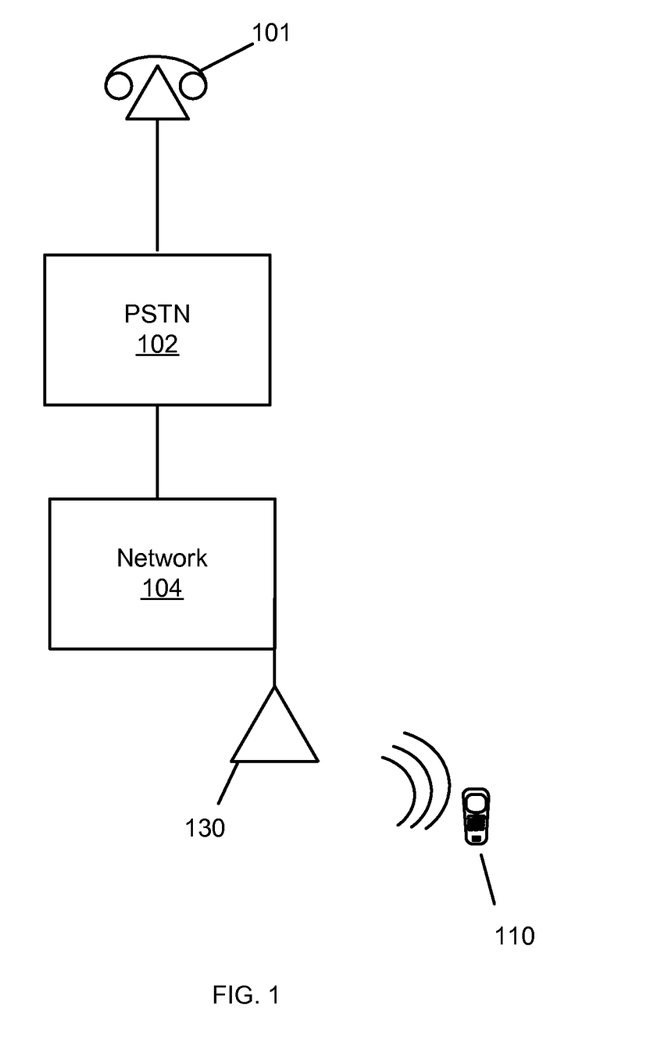
FIG. 1 is a block diagram of an embodiment of a paging arrangement.

FIG. 1 is a block diagram of an embodiment of a paging arrangement. A telephone 101 communicates paging information to a Public Switched Telephone Network (PSTN) 102. The paging information may identify a person or device to page, and may contain additional information (such as a callback number). The paging information takes the form of Dual Tone Multi Frequency (DTMF) tones. The PSTN 102 communicates the paging information to a second network 104. The second network 104 signals a wireless paging device 110 via an antennae 130.

Figure 2:
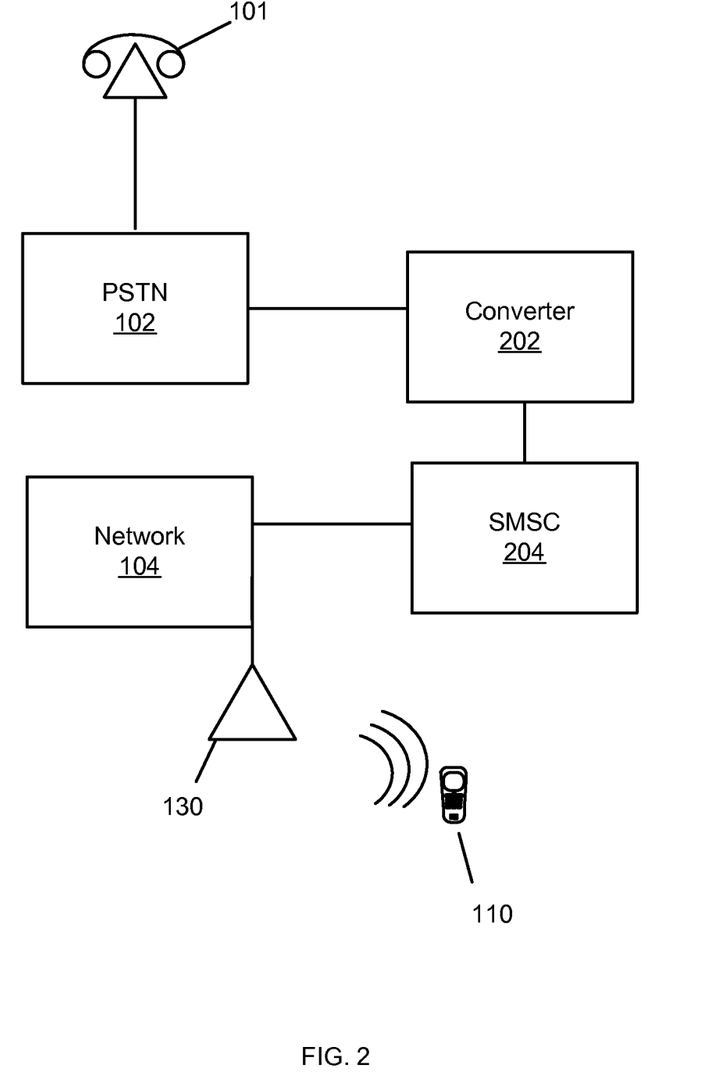
FIG. 2 is a more detailed block diagram of an embodiment of a paging arrangement.

FIG. 2 is a more detailed block diagram of an embodiment of a paging arrangement. The telephone 101 communicates paging information to the Public Switched Telephone Network (PSTN) 102. The PSTN 102 communicates the paging information, in the form of DTMF tones, to a converter 202.

The converter 202 processes the DTMF tones into the Short Message Peer to Peer (SMPP) protocol. The converter includes an input to receive the DTMF information, logic to convert the DTMF information to SMPP, and an output to provide the SMPP to another network element.

The paging information is communicated using SMPP to a Short Message Service Center (SMSC) 204. The SMSC 204 forms an SMS message from the paging information and communicates the SMS message to the second network 104, which signals a wireless paging device 110 via the antennae 130.

Although shown separately for purposes of description, the converter 202 and SMSC 204 may be comprised by the PSTN 102 and/or by the second network 104.

Figure 3:
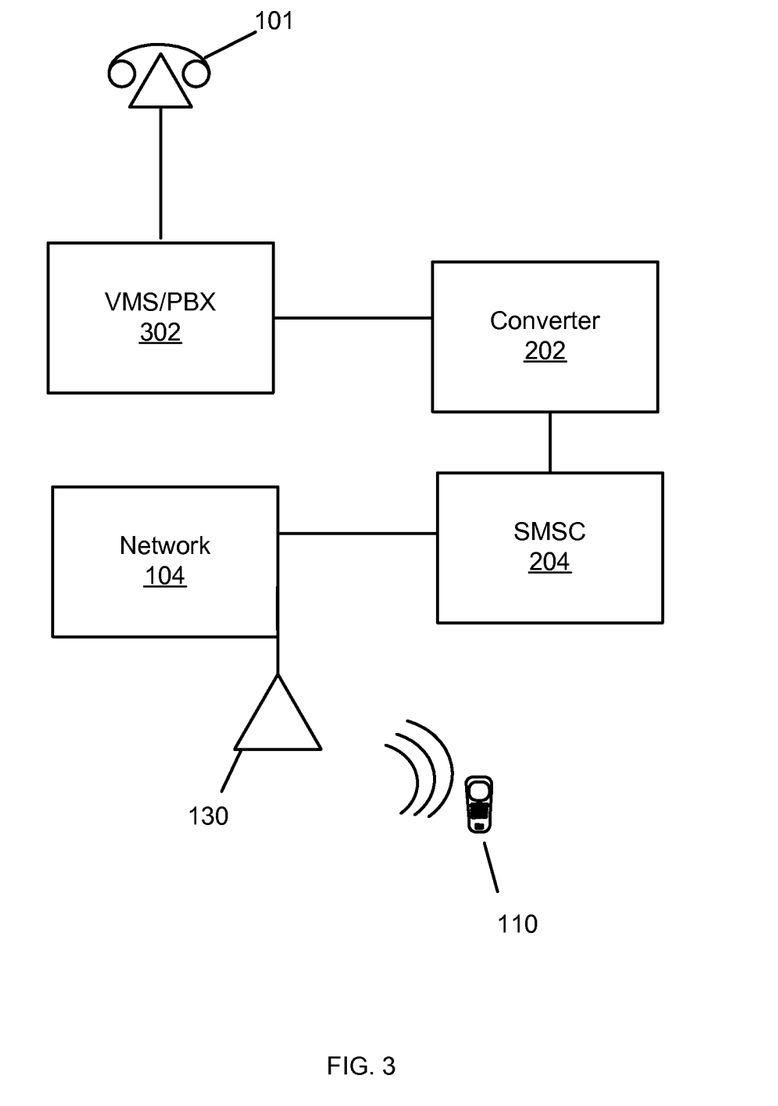
FIG. 3 is a block diagram of another embodiment of a paging arrangement.

FIG. 3 is a block diagram of another embodiment of a paging arrangement. The telephone 101 communicates DTMF paging information to a Voice Mail System (VMS) and/or Private Branch Exchange (PBX) 302. The telephone 101 may communicate with the VMS/PBX 302 using analog or digital signaling. The VMS/PBX 302 communicates the paging information, in the form of DTMF tones, to the converter 202. The converter 202 processes the DTMF tones and communicates the paging information using SMPP to the SMSC 204. The SMSC 204 communicates the paging information as an SMS message to the second network 104, which signals a wireless paging device 110 via the antennae 130.

Although shown separately for purposes of description, the converter 202 and SMSC 204 may in some embodiments be considered part of the network 104.

Figure 4:
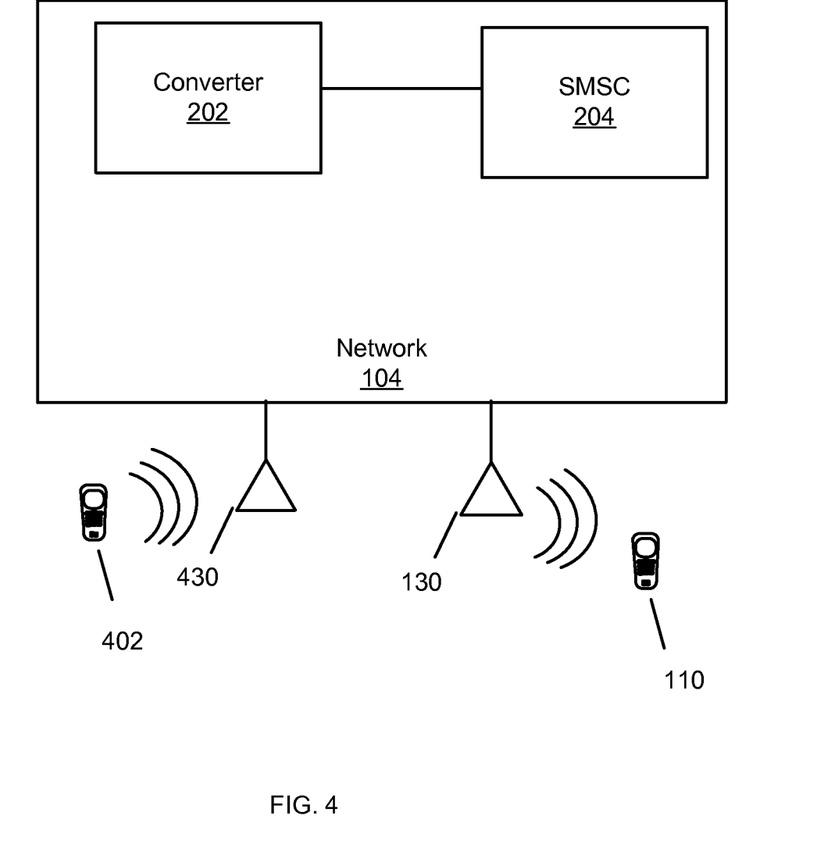
FIG. 4 is a block diagram of another embodiment of a paging arrangement.

FIG. 4 is a block diagram of another embodiment of a paging arrangement. A first wireless device 402 communicates DTMF paging information to the network 104 by way of a first antenna 430. The network 104 communicates the paging information to the converter 202. The converter 202 processes the DTMF tones and communicates the paging information using SMPP to the SMSC 204. The SMSC 204 processes the paging information into an SMS message. The network 104 communicates the SMS message to a wireless paging device 110 via the antennae 130.

By employing the present invention, paging terminals may be omitted from the network environment. The protocol conversion from DTMF to TNPP may be eliminated. Eliminating TNPP traffic may substantially improve network performance, due to the relative inefficiency of TNPP compared to SMPP.

Embodiments of a wireless network will now be described in conjunction with FIGS. 5-7.

Figure 5:
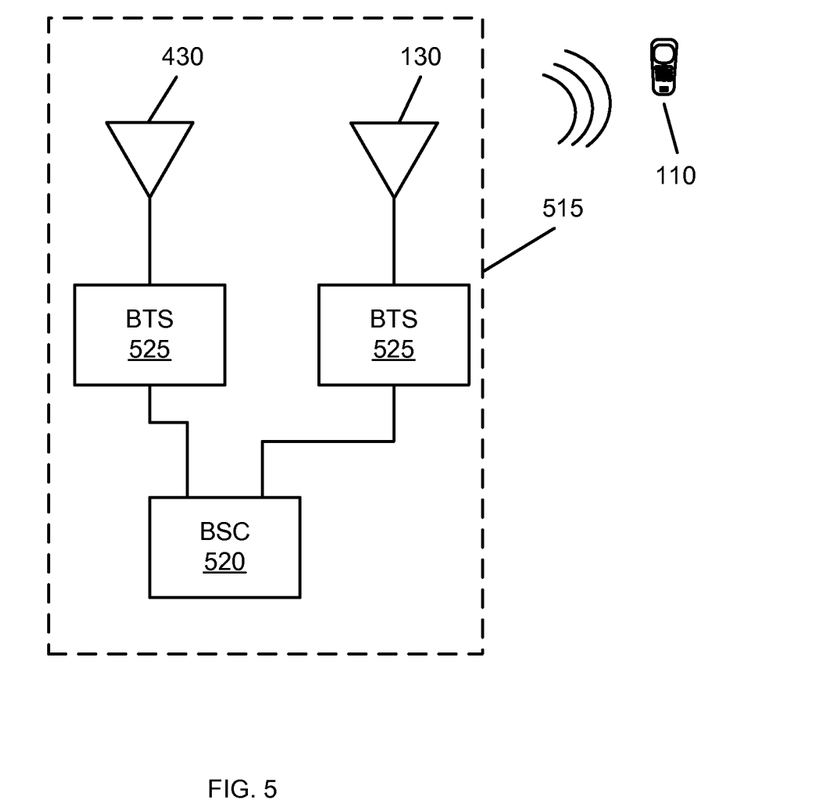
FIGS. 5-7 are block diagrams of embodiments of portions of a network environment.

FIG. 5 shows a block diagram of the base station subsystem of a wireless network. The base station subsystem (BSS) 515 consists of base station controllers (BSC) 520 coupled to one or more base transceiver stations (BTS) 525. In turn, each BTS 525 is coupled to one or more antennas 430, 130.

The BTS 525 includes transmitting and receiving equipment to create a radio interface between the wireless network and terminal devices. Although the antennas 430, 130 are shown as separate elements for clarity, it is common in the industry to collectively refer to the antennas 430, 130, transmitter, and receiver, as the BTS.

The BSC 520 may perform management of the radio interface by allocating channels, managing handover from one BTS to another, paging the wireless device, and transmitting connection-related signaling data.

Figure 6:
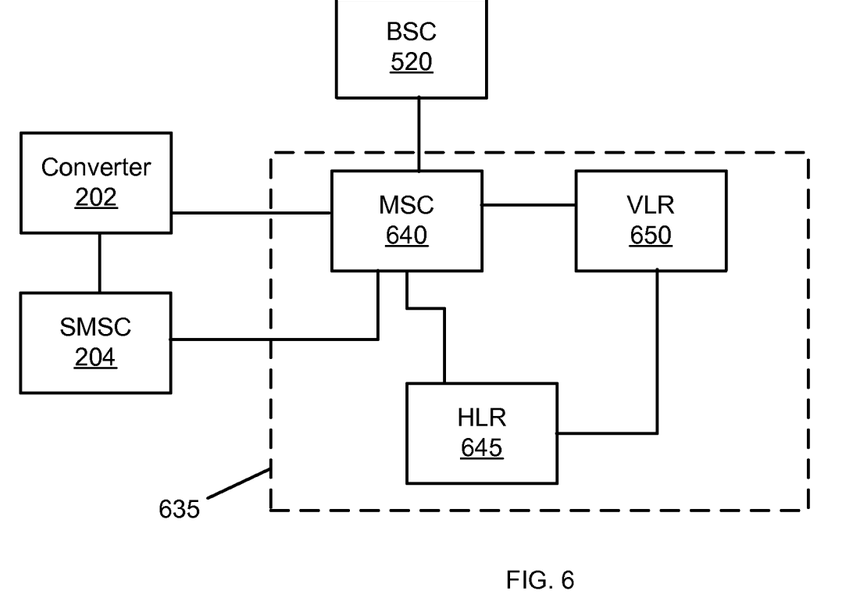

FIG. 6 is a block diagram of the networking and switching subsystem (NSS) 635 of a wireless network. The NSS 635 comprises a Mobile Switching Center (MSC) 640, a Home Location Registry (HLR) 645, and a Visitor Location Registry (VLR) 650. Switching and network management functions are carried out by the NSS 635. The NSS 635 may also act as a gateway between the wireless network and other networks such as the Public Switched Telephone Network (PSTN), Integrated Services Digital Network (ISDN), the Internet, other wireless networks, and the Public Data Network (PDN).

The MSC 640 is a digital switching mechanism that routes communications and manages the network. In GPRS networks, GPRS support nodes (GSNs) such as Switching GSNs (SGSNs) and Gateway GSNs (GGSNs) may provide switching operations similar to those provided by the MSC 640. There can be many MSC 640 in a communication network, each responsible for the signaling required to set up, maintain, and terminate connections to wireless devices within the geographical area served by the MSC 640. Each MSC 640 may manage several BSC 520. The MSC 640 is coupled to a Home Location Registry (HLR) 645 and a Visitor Location Registry (VLR) 650. The HLR 645 is also coupled to the VLR 650.

The HLR 645 may comprise certain dynamic or temporary subscriber data such as current Location Area (LA) of the subscriber's mobile station and Mobile Station Roaming Number (MSRN). Subscriber-related data is recorded in the HLR 645 from which billing and administrative information is extracted when needed by the cellular service provider. Some wireless networks have only one HLR 645 that serves all subscribers; others have multiple HLRs.

The MSC 640 uses the VLR 650 to manage the wireless devices that are currently roaming in the area controlled by the MSC 640. The VLR 650 stores information such as the International Mobile Subscriber Identity (IMSI), authentication data, and telephone number of the roaming wireless devices. The VLR 650 may obtain and comprise subscriber information, such as information about the services to which a roaming user is entitled, from the HLR that serves the wireless device. The VLR 650 controls a pool of MSRN and allocates an MSRN and TMSI to the roaming wireless device. The VLR 650 sends the MSRN and Temporary Mobile Subscriber Identity (TMSI) information to the HLR 645 where they are stored with the subscriber's dynamic records for later use in call routing.

Figure 7:
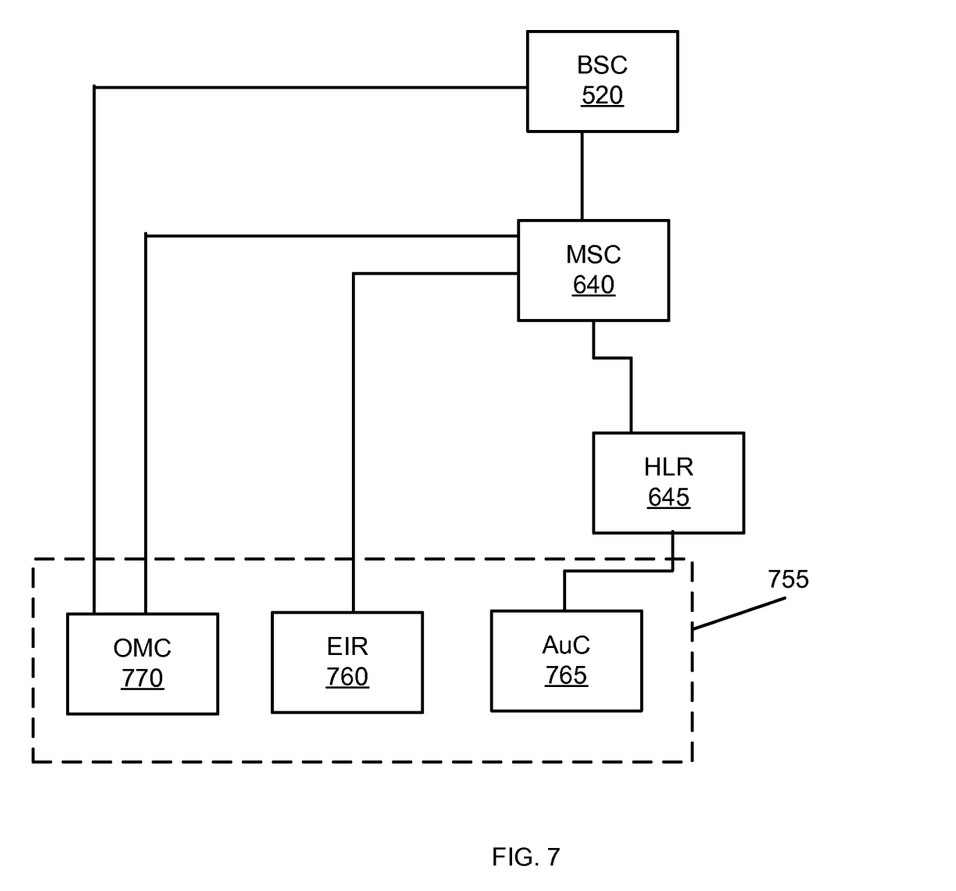

FIG. 7 is a block diagram of the operation subsystem (OSS) 755 of a wireless network 102. The OSS 755 includes an Equipment Identity Register (EIR) 760, an Authentication Center (AuC) 765, and an Operating and Maintenance Center (OMC) 770. The OSS 755 may provide subscription management, network operation, network maintenance, and mobile equipment management. The OSS 755 extracts call data from the HLR 645 in order to bill the subscriber.

The AuC 765 stores data related to network security and authentication of wireless devices and subscribers. The primary purpose of AuC 765 is to prevent fraud by verifying the identity of wireless devices and subscribers that try to access the network. Thus the AuC 765 may comprise authentication algorithms and encryption codes necessary to protect a subscriber's access rights and identity and to prevent eavesdropping.

The EIR 760 is a database which stores subscriber and International Mobile Equipment Identity (IMEI) numbers. Wireless devices are uniquely identified by an IMEI or equivalent number such as an Electronic Serial Number (ESN). An EIR 760 generally indicates the status of a particular wireless device by flags associated with its IMEI. An IMEI is typically flagged as one of either valid, stolen, suspended, or malfunctioning.

The OMC 770 monitors and controls other network elements to enhance system performance and quality. The OMC 770 also administers billing, subscriber service data, and generation of statistical data on the state and capacity of the network.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A non-transitory memory having data stored thereon that, when executed by a processor, causes the processor to including operations comprising:
    receiving a paging information in a form of a dual tone multi frequency tone from a public switched telephone network, the paging information being received from a first communications device;
    converting, by a converter in communication with the public switched telephone network, the paging information from the dual tone multi frequency tone to short message peer to peer protocol paging information;
    receiving, at a short message service center in communication with the converter, the short message peer to peer protocol paging information;
    forming, at the short message service center, a short message service message from the short message peer to peer protocol paging information; and
    sending, from the short message service center, the short message service message to a further network to be communicated to a wireless paging device via the further network.

2. The non-transitory memory of claim 1, wherein the paging information identifies a person to be paged.

3. The non-transitory memory of claim 1, wherein the paging information identifies the wireless paging device to be paged.

4. The non-transitory memory of claim 1, wherein the public switched telephone network receives the paging information from a sending wireless device.

5. The non-transitory memory of claim 1, wherein the further network communicates the short messaging system message to the wireless paging device via an antenna.

6. The non-transitory memory of claim 1, wherein the further network comprises a networking and switching subsystem.

7. The non-transitory memory of claim 1, wherein the further network comprises an operation subsystem.

8. A non-transitory memory having data stored thereon that, when executed by a processor, causes the processor to performs operations comprising:
    receiving a dual tone multi frequency paging information transmitted by a wireless sending device, the dual tone multi frequency paging information being received from a public switched telephone network;

converting, by a converter in communication with the public switched telephone network, the dual tone multi frequency paging information from the dual tone multi frequency tone to short message peer to peer protocol paging information;

transmitting, to a short message service center in communication with the converter, the short message peer to peer protocol paging information, wherein the short message service center forms a short message service message from the short message peer to peer protocol paging information, and sends the short message service message to a further network to be communicated to a wireless paging device via the further network.

9. The non-transitory memory of claim 8, wherein the paging information is transmitted to the public switched telephone network using a telephone.

10. The non-transitory memory of claim 9, wherein the telephone uses an analog signal.

11. The non-transitory memory of claim 9, wherein the telephone uses a digital signal.

12. The non-transitory memory of claim 11, wherein the further network communicates the short messaging system message to the wireless paging device using an antenna.

13. The non-transitory memory of claim 11, wherein the further network comprises an operation subsystem.

14. The non-transitory memory of claim 11, wherein the further network comprises a networking and switching subsystem.

15. A system comprising:

a processor; and a memory that stores instructions that, when executed by the processor, causes the processor to perform operations comprising:

receiving a dual tone multi frequency paging information transmitted by a wireless sending device, the dual tone multi frequency paging information being received from a public switched telephone network;

converting, by a converter in communication with the public switched telephone network, the dual tone multi frequency paging information from the dual tone multi frequency tone to short message peer to peer protocol paging information;

transmitting, to a short message service center in communication with the converter, the short message peer to peer protocol paging information, wherein the short message service center forms a short message service message from the short message peer to peer protocol paging information, and sends the short message service message to a further network to be communicated to a wireless paging device via the further network.

16. The system of claim 15, wherein the short message service center communicates the short messaging system message to the wireless paging device via a second network.

17. The system of claim 16, wherein the second network communicates the short messaging system message to the wireless paging device using an antenna.

18. The system of claim 15, wherein the short message service center is coupled to a home location registry and a visitor location registry.

19. The system of claim 18, wherein the home location registry stores information including an international mobile subscriber identity, an authentication data, and a telephone number of a roaming wireless device.

20. The system of claim 18, wherein the visiting location registry comprises a subscriber information corresponding to services which a roaming wireless device can access.

* * * * *